US009713840B2

United States Patent
Furukawa et al.

(10) Patent No.: US 9,713,840 B2
(45) Date of Patent: Jul. 25, 2017

(54) PIPE WITH RIB AND METHOD FOR MANUFACTURING PIPE WITH RIB

(71) Applicants: Yuichi Furukawa, Toyota (JP); Tsukasa Kato, Toyota (JP); Keiichi Morita, Toyota (JP); Tetsuya Nakajima, Toyota (JP); Jun Yaokawa, Nagakute (JP); Yasushi Iwata, Miyoshi (JP); Yoshio Sugiyama, Seto (JP)

(72) Inventors: Yuichi Furukawa, Toyota (JP); Tsukasa Kato, Toyota (JP); Keiichi Morita, Toyota (JP); Tetsuya Nakajima, Toyota (JP); Jun Yaokawa, Nagakute (JP); Yasushi Iwata, Miyoshi (JP); Yoshio Sugiyama, Seto (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/040,761

(22) Filed: Feb. 10, 2016

(65) Prior Publication Data
US 2016/0158832 A1 Jun. 9, 2016

Related U.S. Application Data

(62) Division of application No. 14/068,344, filed on Oct. 31, 2013, now abandoned.

(30) Foreign Application Priority Data

Oct. 31, 2012 (JP) .................................. 2012-240826

(51) Int. Cl.
*B22D 11/00* (2006.01)
*F16L 9/00* (2006.01)
(Continued)

(52) U.S. Cl.
CPC ............ *B22D 11/006* (2013.01); *B22D 23/00* (2013.01); *B22D 25/02* (2013.01); *F16L 9/003* (2013.01); *F16L 9/006* (2013.01); *F16L 9/02* (2013.01)

(58) Field of Classification Search
CPC ...... B22D 23/00; B22D 25/02; B22D 11/006; B22D 11/128; B22D 11/1281; B22D 11/141; B22D 11/04; B22D 11/041
See application file for complete search history.

(56) References Cited

U.S. PATENT DOCUMENTS 1,974,110 A 9/1934 Higley
3,076,669 A 2/1963 Seymour
(Continued)

FOREIGN PATENT DOCUMENTS

CN 1990132 A 7/2007
JP 63-199050 8/1988
(Continued)

*Primary Examiner* — Kevin P Kerns
*Assistant Examiner* — Steven Ha
(74) *Attorney, Agent, or Firm* — Oblon, McClelland, Maier & Neustadt, L.L.P.

(57) ABSTRACT

A method for manufacturing a pipe with a rib, in which a rib portion formed inside a pipe portion includes bent portions in accordance with bending of the pipe portion or a twisted portion in accordance with twisting of the pipe portion, includes drawing out molten metal held in a furnace by using a starter, from a surface of the molten metal, and drawing up the molten metal through a shape defining member defining a sectional shape of the pipe with the rib to be cast, and cooling and solidifying the molten metal passed through the shape defining member and drawn up. The bent portions are formed by moving at least one of the starter and the shape defining member in a horizontal direction. The twisted portion is formed by rotating at least one of the starter and
(Continued)

the shape defining member about an axis extending along a vertical direction.

6 Claims, 6 Drawing Sheets

(51) Int. Cl.
*B22D 25/02* (2006.01)
*B22D 23/00* (2006.01)
*F16L 9/02* (2006.01)

(56) References Cited

U.S. PATENT DOCUMENTS

| | | |
|---|---|---|
| 3,578,075 A | 5/1971 | Winter |
| 3,920,271 A | 11/1975 | Bluestone |
| 4,222,671 A | 9/1980 | Gilmore |
| 4,466,741 A | 8/1984 | Kojima |
| 5,916,134 A | 6/1999 | Yang et al. |
| 6,217,803 B1 | 4/2001 | Uozumi |
| 6,293,614 B1 | 9/2001 | Takahara et al. |
| 7,017,614 B2 | 3/2006 | Handley |
| 7,967,032 B2 | 6/2011 | Harada et al. |
| 2008/0072983 A1 | 3/2008 | Wu |
| 2012/0055733 A1 | 3/2012 | Wheeler |
| 2013/0171021 A1 | 7/2013 | Yaokawa et al. |

FOREIGN PATENT DOCUMENTS

| | | | |
|---|---|---|---|
| JP | 9-248657 | 9/1997 | |
| JP | 2000-74268 A | 3/2000 | |
| JP | 2001-179398 | 7/2001 | |
| JP | 2001-179398 A | 7/2001 | |
| JP | 2012-61518 | 3/2012 | |
| JP | WO 2012035752 A1 * | 3/2012 | ............ B22D 11/01 |

* cited by examiner

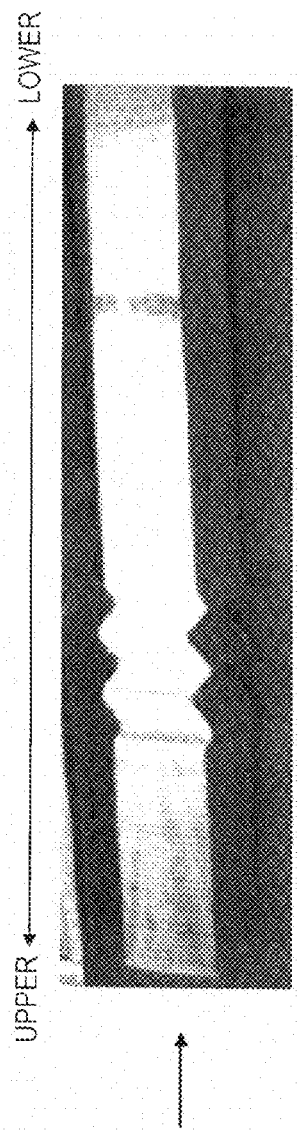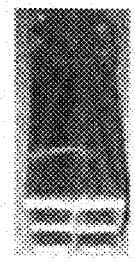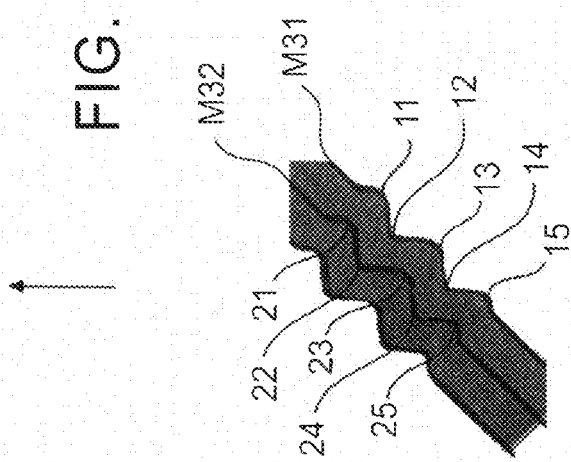

PIPE WITH RIB AND METHOD FOR MANUFACTURING PIPE WITH RIB

CROSS-REFERENCE TO RELATED APPLICATIONS

This application is a divisional of U.S. patent application Ser. No. 14/068,344, filed on Oct. 31, 2013, and claims the benefit of priority under 35 U.S.C. §119 of Japanese Patent Application No. 2012-240826, filed on Oct. 31, 2012. The entire contents of each of the above applications are incorporated herein by reference.

BACKGROUND OF THE INVENTION

1. Field of the Invention

The invention relates to a pipe with a rib, and a method for manufacturing the pipe with a rib.

2. Description of Related Art

In Japanese Patent Application Publication No. 2012-61518 (JP 2012-61518 A), a free casting method is proposed as an up-drawing continuous casting method that does not require a mold. As described in JP 2012-61518 A, after a starter is immersed into a surface of molten metal (or a molten metal surface), the starter is drawn up, and then, the molten metal is also drawn out following the starter by a surface film and surface tension of the molten metal. Here, the molten metal is drawn out through a shape defining member placed near the molten metal surface, and then cooled. This way, continuous casting of a casting having a desired sectional shape is achieved.

In an usual continuous casting method, a shape in a longitudinal direction, as well as a sectional shape, are defined by a mold. In a continuous casting method in particular, solidified metal (or a casting) needs to pass through inside of a mold. Therefore, a casting that has been cast has a shape that extends linearly in a longitudinal direction. On the contrary, in a free casting method, a shape defining member defines only a sectional shape of a casting, and does not define a shape in a longitudinal direction. Since the shape defining member is able to move in a direction parallel to a molten metal surface (or a horizontal direction), castings with various longitudinal shapes are obtained. For example, JP 2012-61518 A describes a hollow casting (or a pipe) formed into a zigzag or helical shape, instead of a linear shape, in a longitudinal direction.

The inventors have found out the followings. With conventional methods including extrusion molding, press forming, welding, cutting, metal mold casting, and so on, it has been extremely difficult to manufacture a pipe that has a rib inside and is non-linearly shaped.

SUMMARY OF THE INVENTION

The present invention provides a pipe that has a rib inside and is non-linearly shaped.

A pipe with a rib according to a first aspect of the present invention includes a pipe portion, and a rib portion formed inside the pipe portion. The rib portion has a plurality of bent portions in accordance with bending of the pipe portion.

In the first aspect, the pipe with the rib may be a continuous casting. Also, the plurality of bent portions may be formed continuously. The plurality of bent portions may be structured so that the adjacent bent portions are bent in opposite directions to each other. Further, the rib portion may further include a twisted portion formed in accordance with twisting of the pipe portion. It has been even more difficult to manufacture such a pipe with a rib by conventional methods.

A pipe with a rib according to a second aspect of the present invention includes a pipe portion, and a rib portion formed inside the pipe portion. The rib portion includes a twisted portion in accordance with twisting of the pipe portion.

In the second embodiment, the pipe with the rib may be a continuous casting.

A method for manufacturing a pipe with a rib according to a third aspect of the present invention is a method for manufacturing a pipe with a rib, in which a rib portion formed inside a pipe portion includes a plurality of bent portions in accordance with bending of the pipe portion. The manufacturing method includes drawing out molten metal held in a molten metal holding furnace by using a starter, from a surface of the molten metal, and drawing up the molten metal through a shape defining member that defines a sectional shape of the pipe with the rib to be cast, and cooling and solidifying the molten metal that has passed through the shape defining member and been drawn up. The plurality of bent portions are formed by moving at least either one of the starter and the shape defining member in a horizontal direction.

According to the third aspect, it is possible to manufacture a pipe with a rib which has been extremely difficult to manufacture by conventional methods including extrusion molding, press forming, welding, cutting, metal mold casting, and so on.

In the third aspect, cooling gas may be introduced to an inner side of the pipe with the rib to be cast, and an opening may be provided in the starter.

A method for manufacturing a pipe with a rib according to a fourth aspect of the present invention is a method for manufacturing a pipe with a rib in which a rib portion formed inside a pipe portion includes a twisted portion in accordance with twisting of the pipe portion. The manufacturing method includes drawing out molten metal held in a molten metal holding furnace by using a starter, from a surface of the molten metal, and drawing up the molten metal through a shape defining member that defines a sectional shape of the pipe with the rib to be cast, and cooling and solidifying the molten metal that has passed through the shape defining member and been drawn up. The twisted portion is formed by rotating at least either one of the starter and the shape defining member about an axis that extends along a vertical direction.

According to the fourth aspect, it is possible to manufacture a pipe with a rib which has been extremely difficult to manufacture by conventional methods including extrusion molding, press forming, welding, cutting, metal mold casting, and so on.

In the fourth aspect, cooling gas may be introduced to an inner side of the pipe with the rib to be cast, and an opening may be provided in the starter.

According to the first to fourth aspects, it is possible to provide a pipe that has a rib inside and is non-linearly shaped.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4A and FIG. 4B are photographs showing external appearance of an example of the casting according to the first embodiment, and FIG. 4C is an X-ray photograph of bent portions of the casting;

DETAILED DESCRIPTION OF EMBODIMENTS

Herein below, specific embodiments, to which the present invention is applied, will be explained in detail with reference to the drawings. It should be noted, however, that the present invention is not limited to the embodiments described below. Also, statements and drawings below are simplified as necessary in order to clarify the explanation.

First Embodiment

Figure 1:
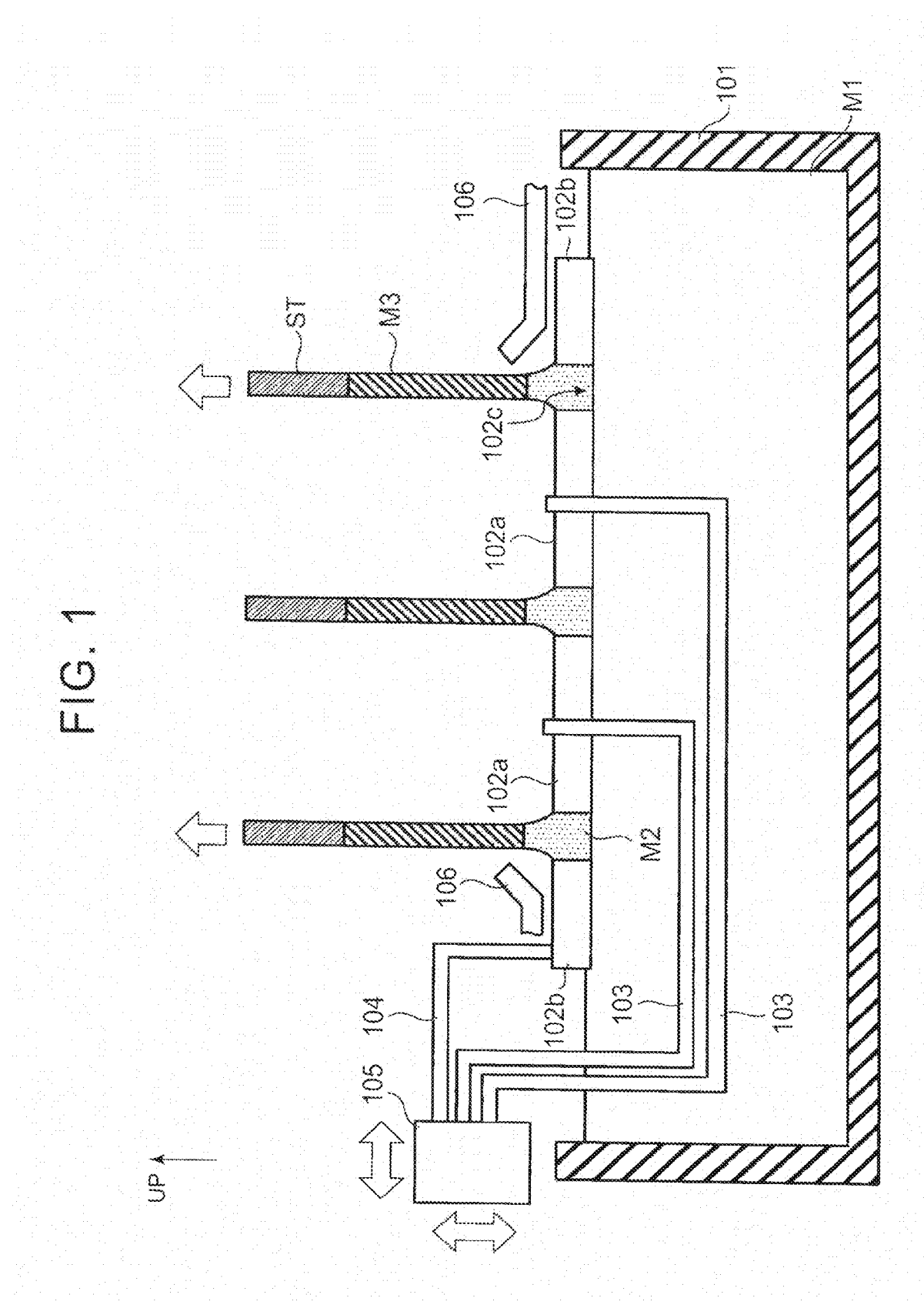
FIG. 1 is a sectional view of a free casting apparatus according to a first embodiment of the present invention.

First, a free casting apparatus (an up-drawing continuous casting apparatus) according to a first embodiment will be explained with reference to FIG. 1. FIG. 1 is a sectional view of a free casting apparatus according to the first embodiment. As shown in FIG. 1, the free casting apparatus according to the first embodiment includes a molten metal holding furnace 101, inner shape defining members 102a, an outer shape defining member 102b, inner cooling gas nozzles 103, a support rod 104, an actuator 105, and outer cooling gas nozzles 106.

The molten metal holding furnace 101 holds molten metal M1 such as aluminum and an aluminum alloy, and keeps the molten metal M1 at predetermined temperature. In the example shown in FIG. 1, since the molten metal is not replenished in the molten metal holding furnace 101 during casting, a surface of the molten metal M1 (or a molten metal surface) is lowered along with a progress of casting. However, the molten metal may be replenished into the molten metal holding furnace 101 as necessary during casting so that the molten metal surface is kept constant. As a matter of course, the molten metal M1 may be other metal or an alloy than aluminum.

The inner shape defining members 102a and the outer shape defining member 102b are made of, for example, ceramics or stainless steel, and arranged near the molten metal surface. In the example shown in FIG. 1, four inner shape defining members 102a and one outer shape defining member 102b are arranged so as to be in contact with the molten metal surface. However, the inner shape defining members 102a and the outer shape defining member 102b may be arranged so that main surfaces of the inner shape defining members 102a and the outer shape defining member 102b on lower sides (a molten metal surface side) do not come into contact with the molten metal surface. To be specific, a predetermined gap (of, for example, approximately 0.5 mm) may be provided between the molten metal surface and, the main surfaces of the inner shape defining members 102a and the outer shape defining member 102b on the lower side. The four inner shape defining members 102a define an inner shape of a casting M3 to be cast, and the outer shape defining member 102b defines an outer shape of the casting M3 to be cast.

Figure 2:
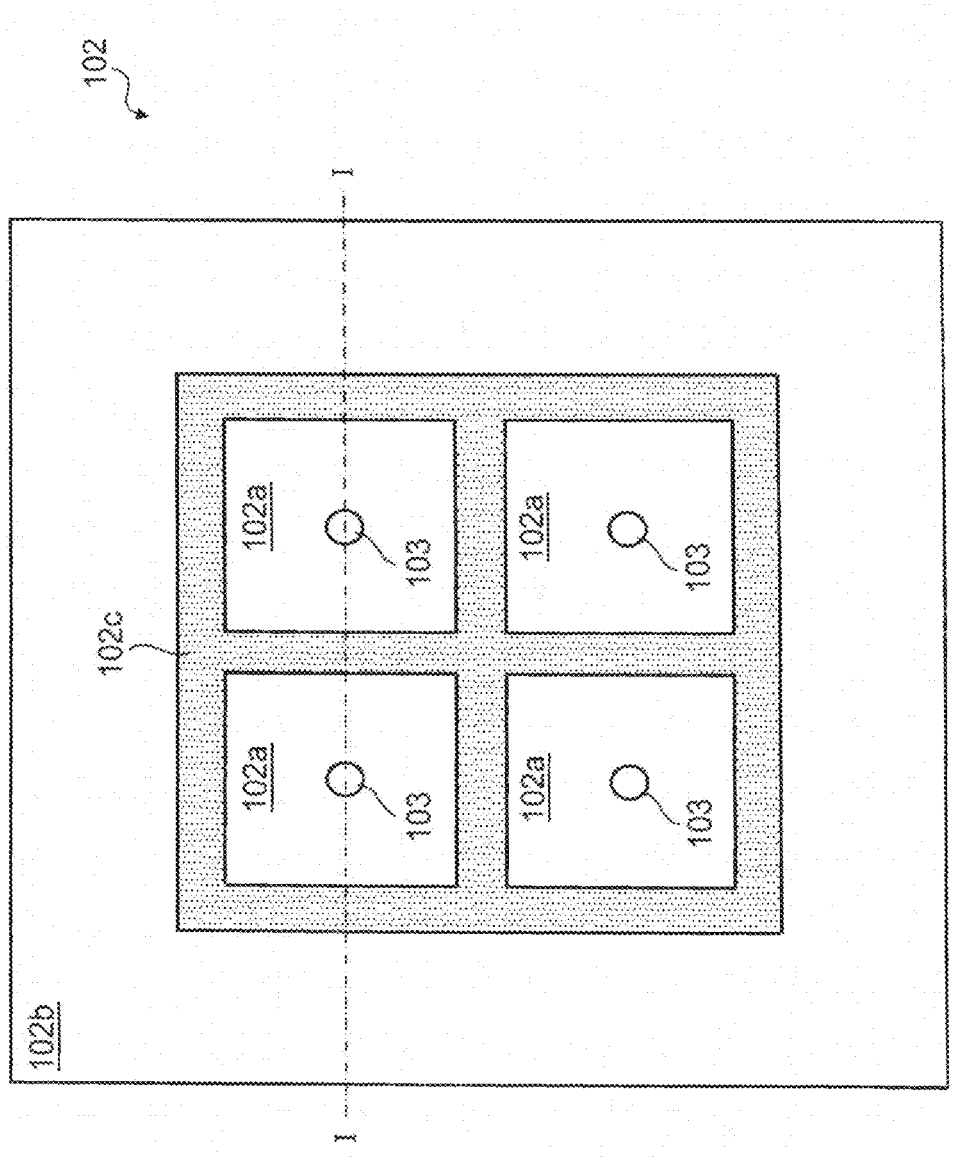
FIG. 2 is a plan view of inner shape defining members and an outer shape defining member of the free casting apparatus.

FIG. 2 is a planar view of the inner shape defining members 102a and the outer shape defining member 102b. The sectional view of the inner shape defining members 102a and the outer shape defining member 102b in FIG. 1 is equivalent to a sectional view taken along a line I-I in FIG. 2. As shown in FIG. 2, the outer shape defining member 102b has, for example, a rectangular planar shape, and has a square opening in the center. The four inner shape defining members 102a have square planar shapes that are congruent with each other, and are arrayed in a 2×2 matrix in the opening of the outer shape defining member 102b. A gap between the inner shape defining members 102a and the outer shape defining member 102b serves as a molten metal passage portion 102c through which the molten metal passes. As described above, the inner shape defining members 102a, the outer shape defining member 102b, and the molten metal passage portion 102c structure a shape defining member 102.

As shown in FIG. 1, the molten metal M1 is drawn up following the casting M3 by a surface film and surface tension of the molten metal M1, and passes through the molten metal passage portion 102c. The molten metal, which is drawn up from the molten metal surface following the casting M3 by a surface film and surface tension of the molten metal, will be referred to as "retained molten metal M2". An interface between the casting M3 and the retained molten metal M2 is a solidification interface.

The four inner cooling gas nozzles (inner cooling parts) 103 are connected to center parts of the inner shape defining members 102a, respectively, and support the inner shape defining members 102a. At the same time, each of the inner cooling gas nozzles 103 blows cooling gas (such as air, nitrogen, argon) on the casting M3 from the center parts of the corresponding inner shape defining member 102a, thus cooling the casting M3 from inside. The support rod 104 supports the outer shape defining member 102b. A positional relation between the inner shape defining members 102a and the outer shape defining member 102b is maintained by the inner cooling gas nozzles 103 and the support rod 104.

The four inner cooling gas nozzles 103 and the support rod 104 are connected to the actuator 105. Due to the actuator 105, the four inner cooling gas nozzles 103 and the support rod 104 are able to move in a vertical direction (a perpendicular direction) and a horizontal direction (parallel to the molten metal surface) while maintaining the positional relation between the inner shape defining members 102a and the outer shape defining member 102b. With such a structure, it is possible that the inner shape defining members 102a and the outer shape defining member 102b are moved in a downward direction as the molten metal surface is lowered along with progress of casting. Also, since the inner shape defining members 102a and the outer shape defining member 102b are able to move in the horizontal direction, a shape of the casting M3 in the longitudinal direction is freely changeable.

The outer cooling gas nozzles (outer cooling parts) 106 is designed to blow cooling gas (such as air, nitrogen, and argon) on the casting M3 and cool the casting M3. The casting M3 is cooled by the cooling gas while the casting M3 is drawn up by a lifting device (not shown) connected to a starter ST. Thus, the retained molten metal M2 near the solidification interface is solidified sequentially, thereby forming the casting M3.

Figure 3:
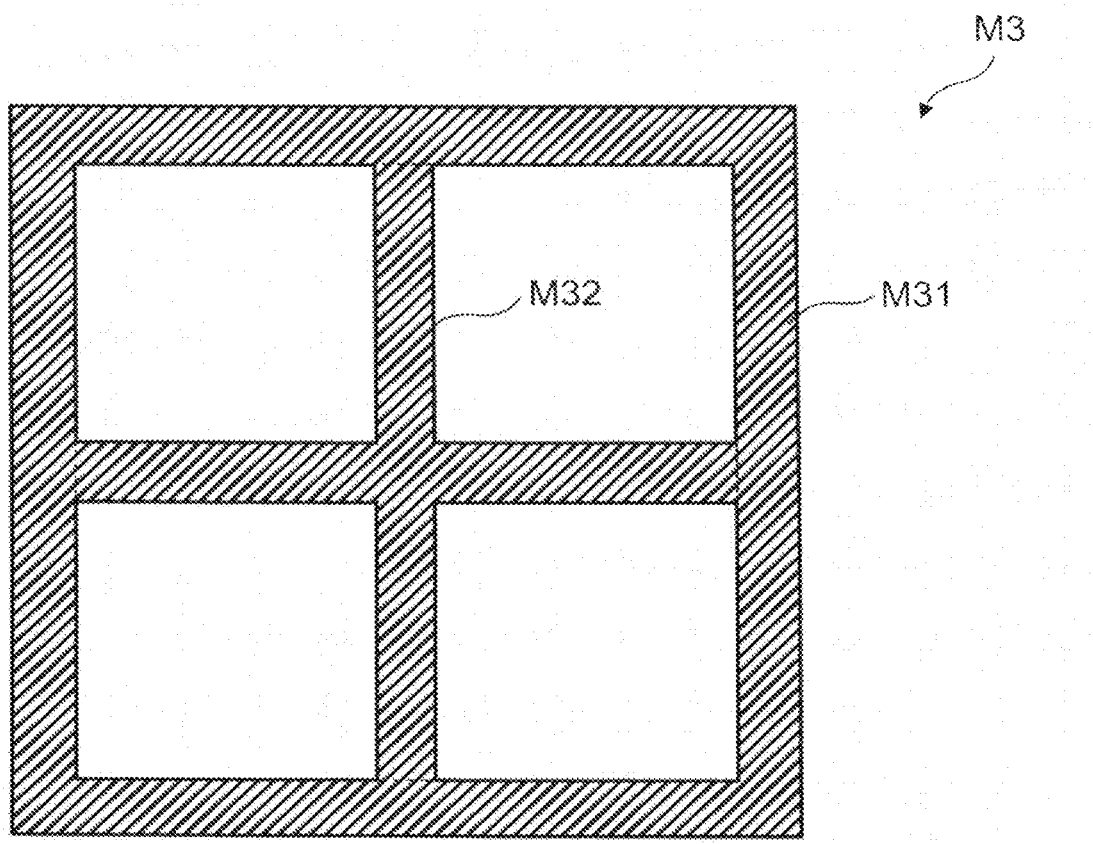
FIG. 3 is a cross-sectional view of a casting according to the first embodiment.

Next, the casting M3 will be explained with reference to FIG. 3 and FIG. 4A to FIG. 4C. FIG. 3 is a sectional view of the casting M3 according to the first embodiment, taken along a horizontal plane. As shown in FIG. 3, the casting M3 is a hollow casting (or a pipe), a section of which taken along the horizontal plane (referred to as a "transverse plane" herein below) has a cross inside a square shape. In other words, the casting M3 includes a pipe portion M31 having a square-shaped section, and a rib portion M32 that is formed inside the pipe portion M31 and has a cross-shaped section. The sectional shapes of the pipe portion M31 and the rib portion M32 are not limited at all. For example, the sectional shape of the pipe portion M31 may be a circular shape, an elliptical shape, a triangle, a polygon such as a pentagon or above, and so on. There is also no limit on the number and the sectional shape of the rib portion M32. It is also possible to change the sectional shape of the casting M3 while casting.

FIG. 4A and FIG. 4B are photographs showing external appearance of an example of the casting M3 according to the first embodiment, and FIG. 4C is an X-ray photograph of bent portions. FIG. 4A is a photograph showing external appearance of an example of the whole casting M3 in the longitudinal direction according to the first embodiment. A left side of the photograph in FIG. 4A is an upper side of the casting M3, and a right side of the photograph is a lower side of the casting M3. The casting M3 shown in FIG. 4A includes five bent portions formed continuously. FIG. 4B is a photograph showing external appearance of the casting M3 seen from obliquely above. The casting M3 is made of an aluminum alloy A6063, and has a section having a cross inside a square shape with a thickness of 1.5 to 2.5 mm (a gap in the molten metal passage portion 102c is 3.0 mm). FIG. 4C is an X-ray photograph showing the five bent portions from the side. The bent portions were photographed by using a digital X-ray sensor NX-06 and a portable X-ray photographic apparatus PX-20HF, made by RF Co., Ltd., under conditions with tube voltage of 74 kVp and tube current time of 25 mAs. As shown in FIG. 4C, the pipe portion M31 of the casting M3 includes the five bent portions 11 to 15. The bent portions adjacent to each other are bent in directions opposite to one another. To be more specific, the bent portions 11, 13, and 15 are bent in the same direction. Also, the bent portions 12 and 14 are bent in the same direction. The bent portions 11, 13, and 15, and the bent portions 12 and 14 are bent in the opposite directions to each other. Further, as shown in FIG. 4C, the rib portion M32 includes five bent portions 21 to 25 corresponding to the five bent portions 11 to 15 of the pipe portion M31. The number of the bent portions can be any number.

As explained above, the casting M3 according to the first embodiment is a pipe with a rib, which includes the pipe portion M31, and the rib portion M32 formed inside the pipe portion M31. In the pipe portion M31, the plurality of bent portions, which are bent in opposite directions to each other, are formed continuously. In the rib portion M32, the bent portions corresponding to the bent portions of the pipe portion M31 are also formed. It has been difficult to manufacture a pipe with a rib having the above-mentioned shape by conventional methods including extrusion molding, press forming, welding, cutting, metal mold casting, and so on, and a combination of these methods. In other words, in the free casting method according to the first embodiment, it is possible to manufacture a pipe with a rib having a shape, which has not been able to be manufactured by the conventional methods and a combination of the conventional methods. The pipe with the rib may be used for, for example, a heat exchanger. Details of the free casting method according to the first embodiment will be explained later.

Figure 5:
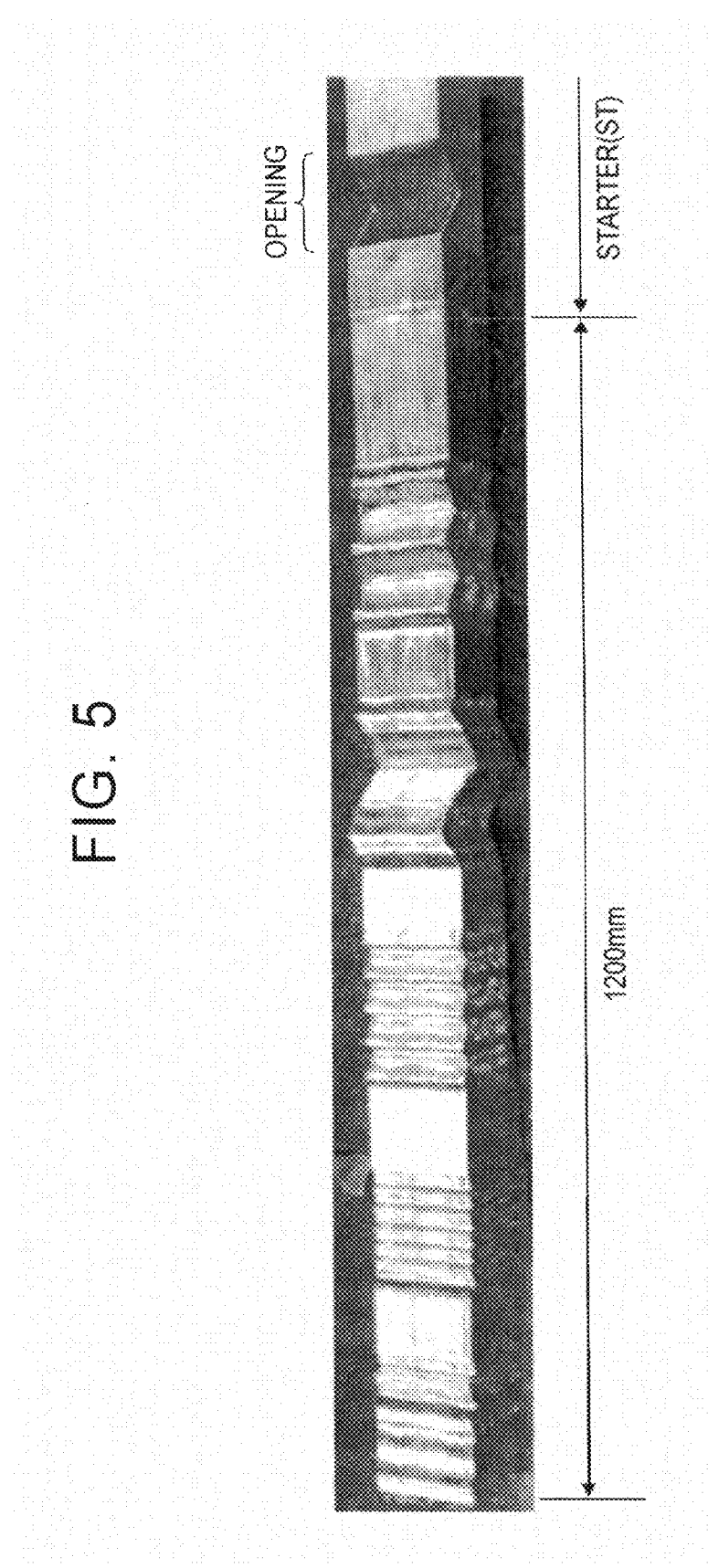
FIG. 5 is a photograph showing external appearance of another example of the casting according to the first embodiment.

FIG. 5 is a photograph showing external appearance of another example of the casting M3 according to the first embodiment. A total length of the casting M3 shown in FIG. 5 is as large as 1200 mm. As shown in FIG. 5, in the free casting method according to the first embodiment, it is possible to form various bent portions continuously or intermittently. Also, since cooling gas is introduced into the casting M3 through the inner cooling gas nozzles 103, an opening for leading out the cooling gas is provided in the starter ST.

Next, the free casting method according to the first embodiment will be explained with reference to FIG. 1. First, the starter ST is lowered so that the starter ST passes through the molten metal passage portion 102c between the inner shape defining members 102a and the outer shape defining member 102b, and a tip end of the starter ST is immersed into the molten metal M1. It is preferred that a starter to be used as the starter ST has a same sectional shape as the casting M3, and extends linearly in the longitudinal direction.

Next, the starter ST starts to be drawn up at a predetermined speed. Here, even if the starter ST is separated from the molten metal surface, the retained molten metal M2 is formed, which follows the starter ST and is drawn up from the molten metal surface by the surface film and surface tension. As shown in FIG. 1, the retained molten metal M2 is formed in the molten metal passage portion 102c between the inner shape defining members 102a and the outer shape defining member 102b. This means that the inner shape defining members 102a and the outer shape defining member 102b give the retained molten metal M2 a shape.

Next, because the starter ST is cooled by the cooling gas blown out from the inner cooling gas nozzles 103 and the outer cooling gas nozzles 106, the retained molten metal M2 is sequentially solidified from the upper side towards the lower side, and the casting M3 thus grows. This way, continuous casting of the casting M3 is achieved. In addition, it is possible to give the casting M3 the bent portions by moving the inner shape defining members 102a and the outer shape defining member 102b in the horizontal direction. Instead of moving the inner shape defining members 102a and the outer shape defining member 102b in the horizontal direction, the starter ST fixed to the lifting device may be moved in the horizontal direction. Alternatively, the inner shape defining members 102a and the outer shape defining member 102b, and the starter ST may be moved in opposite directions to each other within a horizontal plane.

Figure 6A:
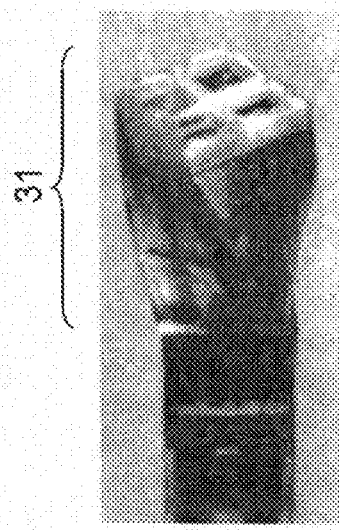
FIG. 6A is a photograph showing external appearance of an example of a casting according to a second embodiment of the present invention.
Figure 6B:
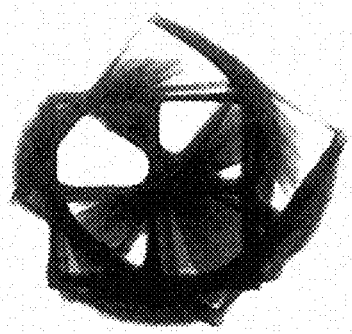
FIG. 6B is an X-ray photograph of a twisted portion of the casting.

(Second embodiment) A casting M3 according to a second embodiment will be explained with reference to FIG. 6A and FIG. 6B. FIG. 6A is a photograph showing external appearance of an example of the casting M3 according to the second embodiment, and FIG. 6B is an X-ray photograph of a twisted portion. The casting M3 shown in FIG. 6A includes a twisted portion 31. The casting M3 is also made of an aluminum alloy A6063 and has a section having a cross inside a square shape with a thickness of 1.5 to 2.5 mm (a gap in the molten metal passage portion 102c is 3.0 mm). FIG. 6B is an X-ray photograph of the twisted portion 31 seen from above. The twisted portion was photographed by using a digital X-ray sensor NX-06 and a portable X-ray photographic apparatus PX-20HF, made by RF Co., Ltd., under conditions with tube voltage of 74 kVp and tube current time of 25 mAs. As shown in FIG. 6B, in the twisted portion 31, a pipe portion M31 and a rib portion M32 are both twisted about a longitudinal direction of the casting M3.

In a free casting method according to the second embodiment, an inner shape defining members 102a and an outer shape defining member 102b are rotated about an axis that extends along a vertical direction in order to give the casting M3 the twisted portion 31. Instead of the inner shape defining members 102a and the outer shape defining member 102b, a starter ST fixed to a lifting device may be rotated about the axis that extends along the vertical direction. Alternatively, inner shape defining members 102a and an outer shape defining member 102b, and the starter ST may be rotated in opposite directions to each other about the axis that extends along the vertical direction.

As stated above, the casting M3 according to the second embodiment is a pipe with a rib, which includes the pipe portion M31, and the rib portion M32 formed inside the pipe portion M31. The casting M3 according to the second embodiment has the twisted portion 31 in which the pipe portion M31 and the rib portion M32 are twisted together about the longitudinal direction of the casting M3. It has been difficult to manufacture a pipe with a rib having the above-mentioned shape by conventional methods including extrusion molding, press forming, welding, cutting, metal mold casting, and so on, and a combination of these methods. In other words, in the free casting method according to the second embodiment, it is possible to manufacture a pipe with a rib having a shape, which has not been able to be manufactured by the conventional methods and a combination of the conventional methods. The pipe with the rib may be used for, for example, a heat exchanger. Due to an anchor effect of the twisted portion 31, for example, the casting M3 is easily fixed in the ground.

The present invention is not limited to the foregoing embodiments, and may be changed as appropriate without departing from the scope of the invention. In particular, the first embodiment and the second embodiment may be combined. In other words, the casting M3 may be a pipe with a rib having both the plurality of bent portions and the twisted portion.

What is claimed is:

1. A method for manufacturing a pipe with a rib, in which the rib is formed inside a pipe portion of the pipe, the rib includes a rib portion, and the rib portion is formed inside the pipe portion and includes a plurality of bent portions in accordance with bending of the pipe portion, comprising:

drawing out molten metal held in a molten metal holding furnace by using a starter, from a surface of the molten metal, and drawing up the molten metal through a shape defining member that defines a sectional shape of the pipe with the rib to be cast; and cooling and solidifying the molten metal that has passed through the shape defining member and been drawn up, wherein the rib connects at least one portion of an inside of the pipe portion and at least one other portion of the inside of the pipe portion, and the plurality of bent portions are formed by moving at least either one of the starter and the shape defining member in a horizontal direction.

2. The method for manufacturing a pipe with a rib according to claim 1, wherein cooling gas is introduced to an inner side of the pipe with the rib to be cast, and an opening is provided in the starter.

3. The method for manufacturing a pipe with a rib according to claim 1, wherein the rib portion includes a cross-shaped section.

4. A method for manufacturing a pipe with a rib, in which the rib is formed inside a pipe portion of the pipe, the rib includes a rib portion, and the rib portion is formed inside the pipe portion and includes a twisted portion in accordance with twisting of the pipe portion, comprising:

drawing out molten metal held in a molten metal holding furnace by using a starter, from a surface of the molten metal, and drawing up the molten metal through a shape defining member that defines a sectional shape of the pipe with the rib to be cast; and cooling and solidifying the molten metal that has passed through the shape defining member and been drawn up, wherein the rib connects at least one portion of an inside of the pipe portion and at least one other portion of the inside of the pipe portion, and the twisted portion is formed by rotating at least either one of the starter and the shape defining member about an axis that extends along a vertical direction.

5. The method for manufacturing a pipe with a rib according to claim 4, wherein cooling gas is introduced to an inner side of the pipe with the rib to be cast, and an opening is provided in the starter.

6. The method for manufacturing a pipe with a rib according to claim 4, wherein the rib portion includes a cross-shaped section.

* * * * *